Figure 1:
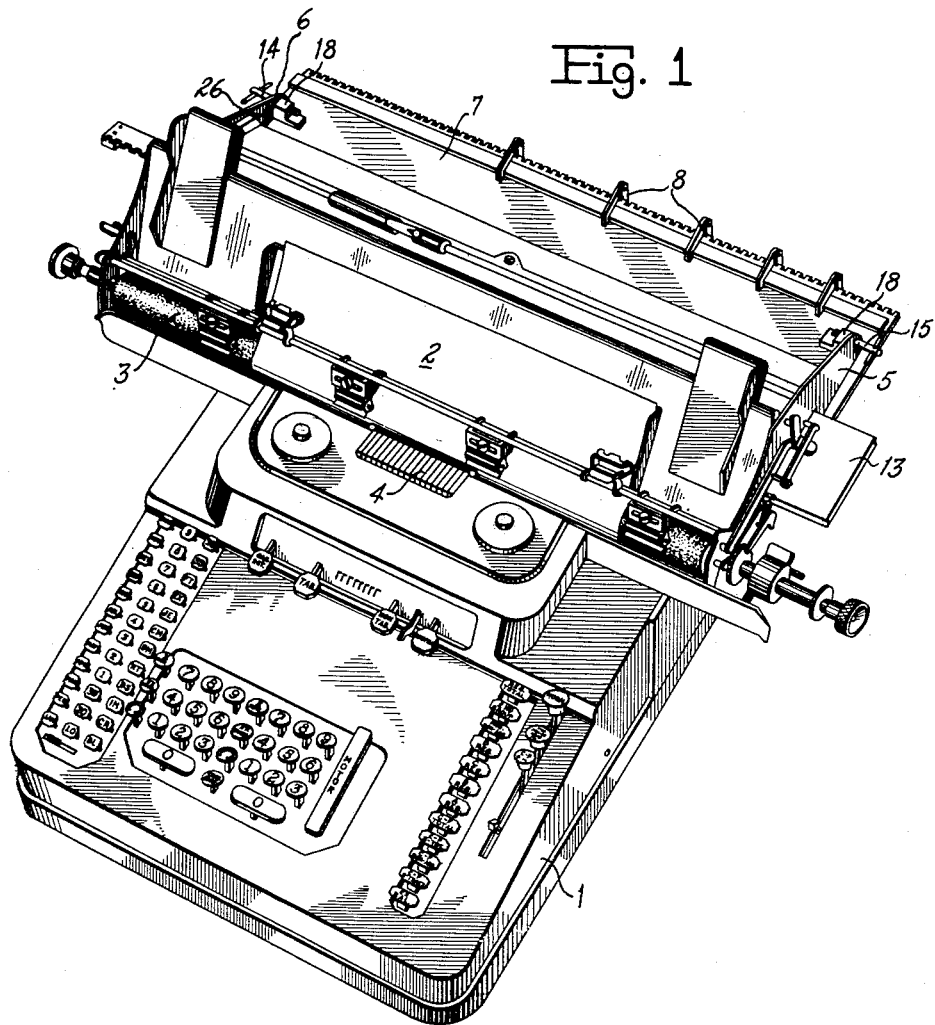

Jan. 28, 1941.   W. A. ANDERSON ET AL   2,229,832
CONTROL PLATE FOR ACCOUNTING MACHINES
Filed June 25, 1937   3 Sheets-Sheet 1

INVENTORS
WALTER A. ANDERSON
OSCAR J. SUNDSTRAND
BY
*L. G. Julihn*
ATTORNEY

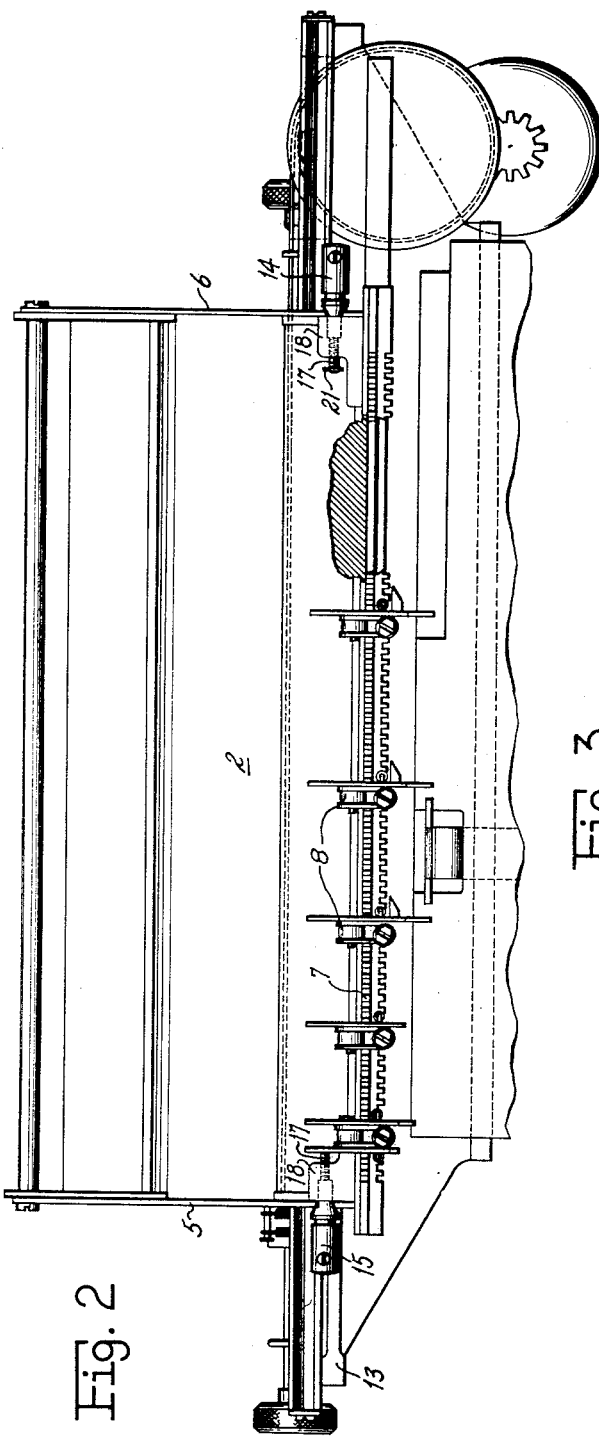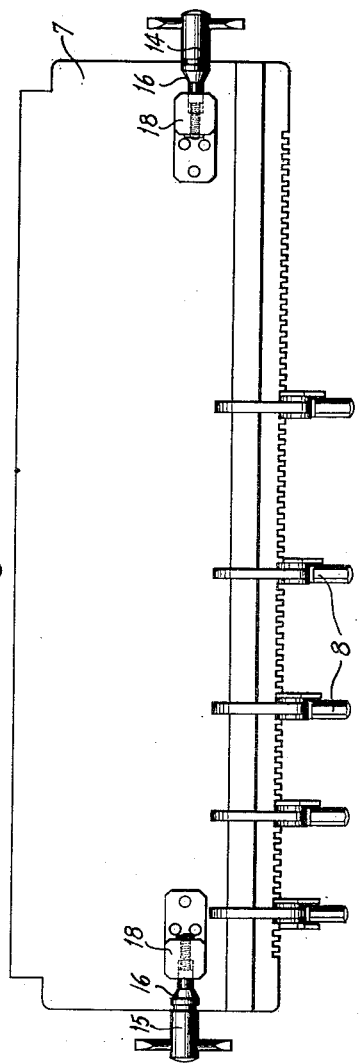

Jan. 28, 1941.  W. A. ANDERSON ET AL  2,229,832
CONTROL PLATE FOR ACCOUNTING MACHINES
Filed June 25, 1937   3 Sheets-Sheet 3

INVENTORS
WALTER A. ANDERSON
OSCAR J. SUNDSTRAND
BY
ATTORNEY

Patented Jan. 28, 1941

2,229,832

UNITED STATES PATENT OFFICE 2,229,832

CONTROL PLATE FOR ACCOUNTING MACHINES

Walter A. Anderson and Oscar J. Sundstrand, Bridgeport, Conn., assignors to Underwood Elliott Fisher Company, New York, N. Y., a corporation of Delaware Application June 25, 1937, Serial No. 150,363

1 Claim. (Cl. 235—58)

This invention relates to removable control plates for accounting machines.

In accounting machines having a traveling paper carriage, it is customary to place certain controlling mechanisms on the carriage in proper alignment to cooperate with corresponding mechanisms on a stationary part of the machine, to initiate certain machine functions in the various columnar positions of the paper carriage.

In many business houses it is desirable to use the same accounting machine for more than one type of accounting work, making it necessary to change the controlling mechanisms on the carriage. Since the controlling mechanisms attached to the carriage often consist of a large number of parts, it has been found desirable, instead of taking these mechanisms off individually and replacing them with others in new locations, to secure these mechanisms to a removable plate and to make this plate readily removable from the machine, so that another plate provided with the controlling mechanisms for the second type of work can be substituted therefor.

Since the controlling mechanisms on the traveling carriage and the corresponding mechanisms on the machine are quite small, and must be aligned perfectly for proper operation, it is necessary that the second control plate be very accurately positioned on the carriage.

The present invention has, therefore, for its primary objects to provide an improved means of attaching a control plate to a traveling carriage whereby the plate is made readily attachable and detachable, and which, when attached to the carriage, will lie in exactly its proper location.

With these and incidental objects in view, the invention consists in certain novel features of construction and combinations of parts, the essential elements of which are set forth in appended claim, and a preferred embodiment of which is hereinafter described with reference to the drawings which accompany and form part of the specification.

Figure 4:
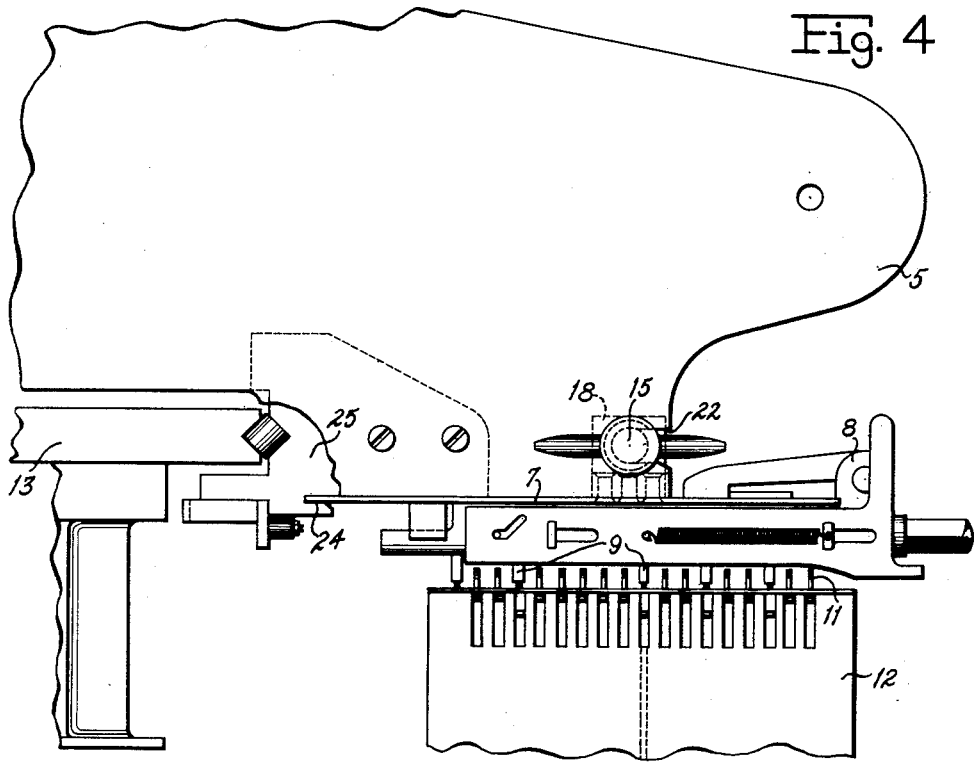
Figure 5:
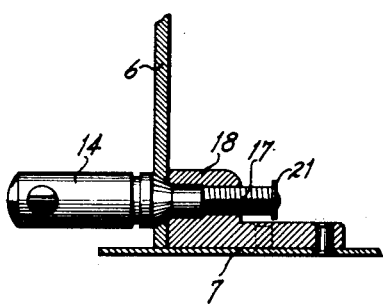
Figure 6:
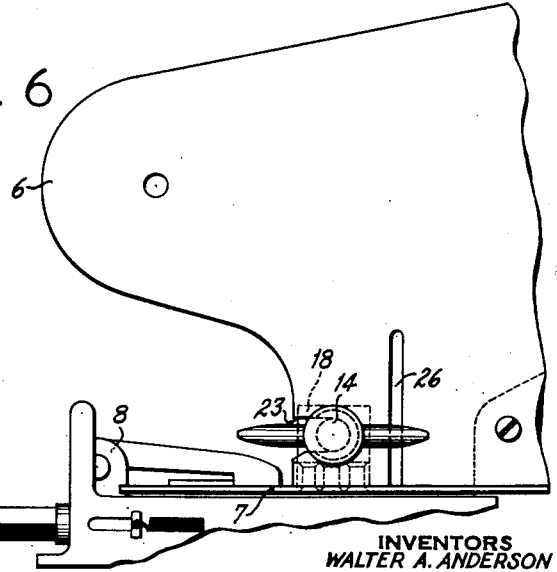

In the drawings:

Figure 1 is a perspective of an accounting machine equipped with the present invention, Figure 2 is a rear view of the traveling paper carriage showing a control plate secured thereon, Figure 3 is a top plan view of a removable control plate, Figure 4 is a right side elevation of a portion of the stationary part of the accounting machine showing the control mechanism on the carriage in proper alignment with control mechanism on a stationary part of the machine, Figure 5 is a front sectional elevation of one of the clamping members for the control plate, and Figure 6 is a left side elevation of a portion of the traveling paper carriage and the clamping means on the left end of the control plate.

Referring to Figure 1, an accounting machine generally indicated at 1 has a traveling paper carriage generally indicated at 2 with the customary roller platen 3 adapted to receive impressions from the type bars 4. The carriage has two side walls 5 and 6 that support much of the carriage mechanism. A control plate 7 is situated at the rear of the carriage and supports control magazines 8 having depending lugs 9 (Figure 4) for cooperation with control levers 11 located in a stationary control box 12. The entire carriage is movable laterally on the machine on a track 13. The above structure is similar to that disclosed in U. S. Patent No. 2,194,270, issued to Oscar J. Sundstrand on March 19, 1940.

In Figure 4 it is seen that lugs 9 and levers 11 must be accurately aligned forwardly and rearwardly of the machine for proper cooperation with each other. The following mechanism is, therefore, provided to obtain accurate alignment of these parts and still have the control plate 7 readily removable.

Referring to Figure 3, two clamps 14 and 15 are provided on the right and left sides respectively of the control plate. Each of these clamps has a beveled portion 16 and a reduced threaded portion 17 (Figure 5). The threaded portion 17 is received by a stationary block 18 secured to control plate 7. A cap 21 is secured to the end of threaded portion 17 to prevent the clamp from being entirely unscrewed. Side walls 5 and 6 (Figures 4 and 6) of the carriage have slots 22 and 23, the edges of which are beveled, to receive the beveled portion of clamps 14 and 15.

To insert a control plate on the machine, clamps 14 and 15 are first unscrewed. The forward edge of the control plate is then inserted in a slot 24 (Figure 4) in a casting 25 on the carriage. When the plate is fully inserted in the slot 24, the right hand clamp 15 is tightened. After this clamp has been completely tightened the left hand clamp 14 is tightened.

A slot 26 (Figure 6) is provided adjacent slot 23 in the left hand side wall 6 so that if the distance between blocks 18 on different control plates varies, side wall 6 can readily be sprung far enough to compensate for the error.

To remove the control plate in order to substitute another, it is obviously necessary only to loosen clamps 14 and 15 and draw the plate rearwardly.

While the form of mechanism herein shown and described is admirably adapted to fulfill the objects primarily stated, it is to be understood that it is not intended to confine the invention to the one form of embodiment herein disclosed for it is susceptible of embodiment in various forms all coming within the scope of the claim which follows.

What is claimed is:

In a machine of the class described having means for controlling various accounting functions thereof, a traveling paper carriage thereon having two side walls, and a plate supporting controls for rendering the first means effective or ineffective, means for securing the plate to the carriage, the means including a holding device on the carriage to support one edge of the control plate, a clamping member at each end of the control plate, seats on the side walls of the carriage to receive the clamping members, and a flexible ear on one of the side walls, on which ear one of the seats is located to enable the corresponding clamping member to spring the carriage side wall if necessary to take up end play between the clamping member and the side wall.

WALTER A. ANDERSON.
OSCAR J. SUNDSTRAND.